United States Patent Office 3,248,428
Patented Apr. 26, 1966

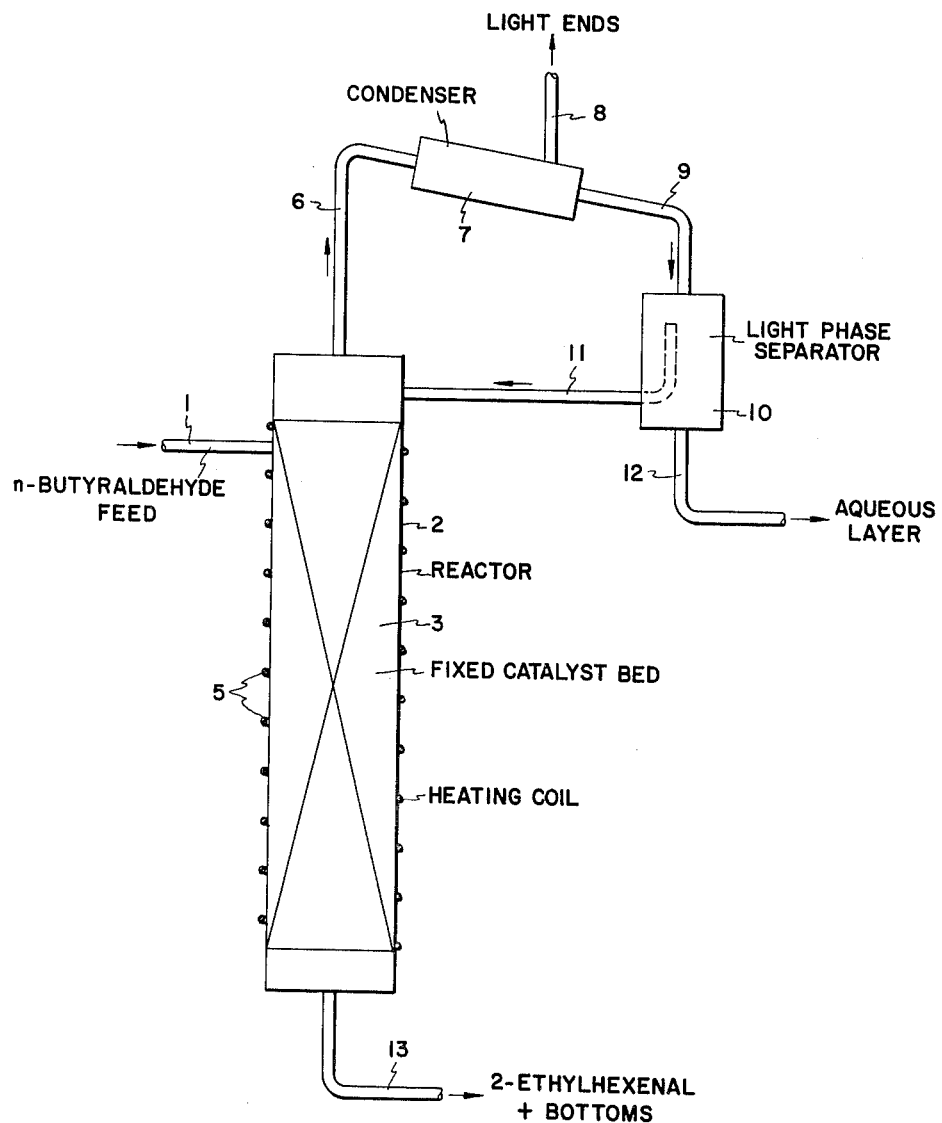

3,248,428
ALDOLIZATION PROCESS
Walter James Porter, Jr., James Andrew Wingate, and James Allen Hanan, Baton Rouge, La., assignors to Esso Research and Engineering Company, a corporation of Delaware
Filed Dec. 22, 1961, Ser. No. 161,723
11 Claims. (Cl. 260—593)

This invention relates to a process for producing alpha, beta-unsaturated carbonyl compounds of increased molecular weight by the condensation of carbonyl compounds of relatively lower molecular weight. More particularly, it relates to a process wherein aldehydes or ketones or mixtures thereof are aldolized and dehydrated in the presence of a solid, insoluble catalyst comprising the reaction product of molybdenum oxide and magnesium oxide.

The liquid phase aldolization of aldehydes or ketones in the presence of strong bases is well known in the art. The hydroxy carbonyl or aldol compounds formed in the presence of these catalysts are generally subjected to a subsequent dehydration step in order to produce the corresponding alpha, beta-unsaturated aldehydes or ketones. Difficulties are experienced in such process, however, because the strong bases tend to promote further reaction of the products which initially result from the simple condensation of two carbonyl molecules. Consequently, the yields of alpha, beta-unsaturated carbonyl compounds from such processes are generally unsatisfactory, and the isolation of pure products is difficult.

The production of alpha, beta-unsaturated carbonyl compounds by passing carbonyl reactants in the vapor phase at elevated temperatures over a fixed catalyst bed is also known. However, the yields of alpha, beta-unsaturated products are generally low per pass and, in addition, one must contend with the disadvantages inherent in vapor phase operations.

More recently, it has been discovered that alpha, beta-unsaturated carbonyl compounds are produced by heating, for example, aldehydes in the liquid phase with metal soap catalysts which are soluble therein. To a greater or lesser degree, the soaps of a wide variety of metals, for example, cobalt, manganese, magnesium, zinc, lead and the like, have been found to be catalytically active. Generally, the conversions and selectivities to alpha, beta-unsaturated aldehydes are high in the soap-catalyzed processes; however, use of the soluble soap catalysts presents an additional problem. Before the alpha, beta-unsaturated product can be processed further, for example, by hydrogenation to the corresponding alcohols, the soluble catalyst content must be reduced to below about 10 to 20 p.p.m. While suitable demetalling processes are known to the art, this additional processing step necessarily adds to the ultimate cost of the product.

These and other disadvantages of the prior art processes for producing alpha, beta-unsaturated carbonyl compounds of increased molecular weight from carbonyl compounds of relatively lower molecular weight are overcome by the present invention.

It has now been surprisingly found that alpha, beta-unsaturated carbonyl compounds can readily and conveniently be produced by contacting two molecules of the same or different "monomer" carbonyl compounds in liquid phase and at elevated temperatures with a catalyst comprising the reaction product of molybdenum oxide and magnesium oxide. High conversions of the reactants and high selectivities to the desired alpha, beta-unsaturated carbonyl products are realized by this novel process. Furthermore, since the oxide reaction product catalyst is substantially insoluble in the reactants and in the products, its use in liquid phase aldolization processes as described herein effectively eliminates the necessity for subjecting the products to a demetalling step.

The process of the present invention is applicable to a wide variety of aldehyde, ketone, and mixed aldehyde-ketone feeds. Practical considerations such as availability make those aldehydes or ketones having up to about 20 carbon atoms particularly desirable as feeds, although there is no reason why higher molecular weight carbonyl compounds cannot be used. In order to obtain alpha, beta-unsaturated carbonyl products, it is necessary that the feed employed in the process comprise a carbonyl compound having at least two alpha hydrogen atoms, i.e. at least two hydrogen atoms bonded to a carbon atom next adjacent the carbonyl group. That is to say, the feed to the process must contain at least one $C_2$ to $C_{20}$ reactant having the general formula:

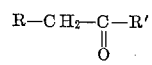

where R and R' can be the same or different and are selected from the classing consisting of hydrogen, alkyl, cycloalkyl, aryl and aralkyl radicals. Mixed feeds are also suitable in the present process, i.e. the feed may comprise two molecules of the same aldehyde or ketone, two molecules of different aldehydes or different ketones, or one molecule of an aldehyde and one molecule of a ketone. Typical combinations of reactants are shown in the following equations in which representative carbonyl compounds are used for purposes of illustration.

1.

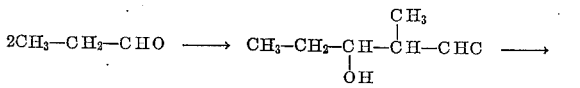

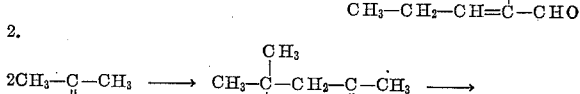

2.

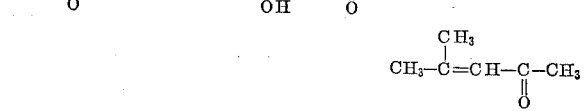

3.

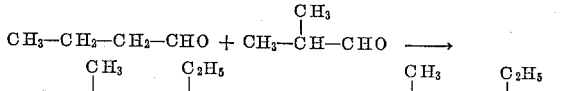

4.

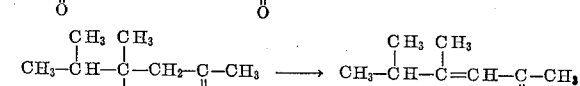

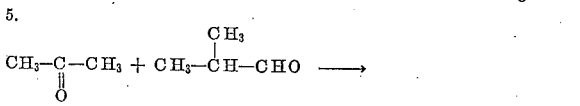

5.

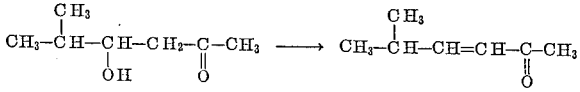

While any combinations of reactants such as those illustrated may serve as the feed to the present process, it will be recognized that where more than one molecular species of reactant is employed, mixtures of products are produced. To minimize the problems associated with the separation of complex mixtures, it is preferred to select reactants or ratios thereof so that the production of a single product is favored. For example, by having only one molecular species of carbonyl reactant in the feed, or where more than a single species is present, employing the less reactive species in excess, the production of a single alpha, beta-unsaturated carbonyl product is promoted.

Of the wide variety of reactants and combinations thereof which may be used as feeds in the present process, the aliphatic carbonyl compounds having at least two alpha hydrogen atoms are preferred, and especially the $C_2$ to $C_{10}$ aliphatic aldehydes and ketones, e.g. acetaldehyde, propionaldehyde, n-butyraldehyde, acetone, methyl ethyl ketone, n-octylaldehyde, n-decylaldehyde, 2-ethylhexaldehyde, methyl isobutyl ketone, methyl isoamyl ketone, and the like. Of course, an aldehyde or ketone which does not contain two alpha hydrogen atoms, e.g. formaldehyde, may be a reactant in the present process provided the reaction mixture also contains a carbonyl compound having the required alpha hydrogen atoms.

As noted hereinabove, the catalysts of the present process comprise molybdenum oxide and magnesium oxide in chemical combination. That is to say, the catalysts of this invention contain as the active ingredient a reaction product such as that obtained when a mixture of molybdenum oxide and magnesium oxide, e.g. $MoO_3$ and $MgO$, is calcined. The nature of the resultant product is not known with certainty; however, it is known to comprise the oxides in a chemically reacted form. A mere physical mixture of the oxides is not produced, for the reaction product does not exhibit the characteristics X-ray diffraction patterns of the individual oxide components. While we do not wish to be bound by any theory, it appears that at elevated temperatures the molybdenum and magnesium oxides react to form a hard, durable amorphous, spinel-type material.

The ratio of oxides used to produce the $MoO_3$–$MgO$ reaction product may be varied considerably. For example, from about 0.5 to 15 parts by weight of molybdenum oxide per part of magnesium oxide can be used. However, the reaction product obtained upon calcining a mixture containing from about 0.8 to 5 parts by weight of $MoO_3$ per part of $MgO$ oxide is preferred and especially that product derived from equimolar amounts of the two oxides, i.e. 3.6 parts of $MoO_3$ per part of $MgO$. It is, of course, not required that $MoO_3$ and $MgO$ per se be used to obtain the desired reaction product. Any inorganic or organic compounds of the metals which upon calcining will form the respective oxides, e.g. nitrates, carbonates, hydroxides, acetates, oxalates, and the like may also be used. Calcining temperatures will vary somewhat depending upon the nature of the compounds employed, but in general will be between about 300° to 1500° F., e.g. 1100° F.

The oxide reaction product may be utilized in various forms, for example, the product per se may be crushed to suitable size and packed to form a solid catalyst bed, or it may be powdered and pelletized, pilled or compacted into various shapes. It may also be employed as the active ingredient in combination will a catalyst support or carrier such as alumina, bauxite, coke, kieselguhr, limestone, silica gel and similar materials well known in the catalyst art. Those materials characterized as high surface area supports, i.e. those providing surface areas in excess of about 100 square meters per gram, are to be preferred, especially alumina. Any of the means commonly employed to produce supported oxide catalysts may be used. (See, for example, Watts U.S. Patent 2,888,396.) Generally, the supported catalyst will contain from about 1 to 20 wt. percent, preferably 5 to 15 wt. percent, of the reaction product of the molybdenum and magnesium oxides. Although compositions outside of these ranges can be used, they are effective to a lesser degree.

The process of the invention is carried out in the liquid phase at elevated temperatures. That is to say, the carbonyl reactant or reactants, either in the presence or absence of an inert solvent, e.g. aliphatic or aromatic hydrocarbons and the like, is contacted as a liquid with the molybdenum oxide-magnesium oxide reaction product at a temperature between about 50° F. and 600° F. The exact temperature to be used is not critical and is somewhat dependent on the particular carbonyl reactant or combination thereof in the feed. Whether or not a diluting solvent is employed, as well as the time of contanct with the catalyst which may vary from about 5 minutes to about 4 hours, will also, to some extent, determine the reaction temperature. With most carbonyl reactants, and especially with the $C_1$ to $C_{10}$ aliphatic carbonyl compounds, a temperature of between about 100° F. and 400° F., with contact times between about 15 minutes to 2 hours, is preferred.

The pressure at which the process is carried out must exceed the vapor pressure of the reaction mixture at the operating temperature, that is, the pressure should be sufficient to maintain a liquid reactant phase in contact with the catalyst. Otherwise, the pressure is not critical and atmospheric, subatmospheric, or superatmospheric pressures may be employed. With the lower molecular weight reactants, e.g. $C_1$ to $C_{10}$ carbonyl compounds, pressures slightly above atmospheric are required to maintain the reactants in the liquid phase. On the other hand, with the higher molecular weight reactants, e.g. $C_{11}$ to $C_{20}$, it may be desirable to use slightly reduced pressures. Where the reaction is carried out under superatmospheric pressures, the autogeneous pressure of the reactants is generally sufficient. Where higher pressures are desired, the reaction may be carried out under pressures produced by the addition of gases such as nitrogen or hydrogen.

The process may be carried out in a batch, semicontinuous, or continuous manner. Any apparatus may be used wherein the necessary temperature and liquid phase conditions can be maintained. It is preferred, however, to employ a system from which the water of reaction can be removed as it forms. The accompanying drawing illustrates such preferred system. The manner of carrying out the process in this system will be described using normal butyraldehyde as a typical feed.

n-Butyraldehyde is passed in liquid phase at a rate of 0.98 v./v./hr. (volume of feed/volume of catalyst/hour) via line 1 into reactor 2. Reactor 2 is packed with a fixed bed 3 of 0.25-in. (diam.) by 0.25-in. (length) pills of the molybdenum oxide-magnesium oxide reaction product. The catalyst bed is maintained at a temperature between about 250° F. and 450° F., e.g. 426° F., with electrical resistance heaters 5 or other suitable means. Pressure within the tower is the autogeneous pressure of the reaction mixture, e.g. about 195 p.s.i.g. The liquid in reactor 2 is maintained at a level sufficient to cover the fixed catalyst bed. Aldolization of the butyraldehyde and dehydration of the condensation product occur in the packed sections of the reactor to produce a mixture of unreacted n-butyraldehyde, water, and 2-ethylhexenal. Under the process conditions, an azeotropic mixture of n-butyraldehyde and water refluxes into the uppermost portion of the column. The azeotrope is removed through line 6 and passed into condenser 7. Light ends in the feed or formed during the reaction are vented from condenser 7 through line 8, while the liquid condensate is passed through line 9 into phase separator 10. The upper layer of condensate which forms in separator 10 is predominantly n-butyraldehyde. This phase is recycled through line 11 into reaction tower 2. The water phase, which contains a minor proportion of n-butyraldehyde dissolved therein, is removed via line 12. The n-butyraldehyde in the water phase may be recovered and recycled if so desired. The aldolization and dehydration reaction product, 2-ethylhexenal, is removed from the catalyst bed through line 13 for further purification and processing.

The following additional examples will further serve to illustrate the advantages of the present process.

EXAMPLE 1

Equimolar amounts of ammonium molybdate and magnesium oxide, MgO, in powder form were dry-mixed. Sufficient distilled water to produce a thick paste was then added to the mixture. The paste was dried at 400° F. over a period of about 16 hours. The resulting cement-like product was crushed and ground to a fine powder. The powder was passed through a pill press to obtain pills approximately ¼-inch in diameter by ¼-inch in length. The pills were calcined for 16 hours at 1100° F., and then cooled under a dry nitrogen atmosphere prior to their use.

Analysis of the calcined product by X-ray diffraction disclosed that the characteristic lines for molybdenum oxide and magnesium oxide were absent. Hence, a product of the oxides was formed rather than a mere physical admixture.

EXAMPLE 2

The data obtained in this experiment illustrate the high conversion and high selectivity to 2-ethylhexenal obtained by the condensation of butyraldehyde at two different temperatures and residence times over the catalyst of Example 1. The n-butyraldehyde was passed downflow in liquid phase over a fixed bed of about 350 cc. of the pilled catalyst at the vapor pressure of the reactant-product mixture. Water of reaction was removed overhead as it formed in azeotropic combination with a portion of the n-butyraldehyde feed. External heat was applied with electrical resistance heaters to maintain the catalyst bed at the temperatures indicated in Table I. Products were analyzed by gas chromatography. The following results were obtained:

Table I

| | Run 1 | Run 2 |
|---|---|---|
| Temperature, °F | 350 | 425 |
| Holding time, hrs | 2.0 | 1.0 |
| Conversion of n-butyraldehyde, wt. percent | 75.9 | 79.2 |
| Selectivity mol percent of n-butyraldehyde to 2-ethylhexenal | 89.9 | 86.6 |

By substituting the aldehydes of Table II for the n-butyraldehyde feed, the following products are produced by the same procedure:

Table II

| Feed: | Product |
|---|---|
| Acetaldehyde | Crotonaldehyde. |
| Propionaldehyde | 2-methyl pentenal. |
| n-Octyl aldehyde | Hexadecenal. |
| n-Nonyl aldehyde | Octadecenal. |
| n-Lauryl aldehyde | Tetracosenal. |

EXAMPLE 3

The condensation of acetone and subsequent dehydration to mesityl oxide over the catalyst of Example 1 was carried out as described in Example 2 except that the water of reaction was not removed from the reaction mixture. The results of Table III were obtained.

Table III

| | |
|---|---|
| Temperature, °F. | 400 |
| Holding time, hrs. | 2 |
| Acetone conversion, wt. percent | 11.0 |
| Selectivity to mesityl oxide, mol percent | 63.0 |

In a similar way, methyl ethyl ketone is converted to a mixture of 3-methyl 3-heptene-5-one and 3-methyl 2-heptene-5-one.

EXAMPLE 4

A feed consisting of 2 equivalents acetone per equivalent of isobutyraldehyde was blended and passed downflow over the catalyst of Example 1 as described in Example 2. Temperature and holding time are given in Table IV together with a summary of the results:

Table IV

| | |
|---|---|
| Temperature, °F. | 475 |
| Holding time, hrs. | 1 |
| Acetone conversion, wt. percent | 28.2 |
| Acetone selectivity to MIAK[1] antecedent, mol percent | 76.5 |
| Aldehyde conversion, wt. percent | 63.4 |
| Aldehyde selectivity to MIAK[1] antecedent, mol percent | 72.4 |

[1] Alpha,beta-unsaturated precursors of methyl isoamyl ketone.

This example illustrates the applicability of the process to mixed ketone-aldehyde feeds. In a similar manner, a feed comprising methyl ethyl ketone and isobutyraldehyde is converted to a mixture of 3-methyl 3-heptene-5-one, 2-methyl 3-heptene-5-one and 2,4-dimethyl 3-hexene-5-one.

EXAMPLE 5

The use of a catalyst comprising 10 wt. percent of the reaction product of molybdenum oxide and magnesium oxide, deposited on a high surface area alumina, is illustrated in this example.

A catalyst grade alumina having a surface area between about 200 to 250 sq. meters/gram and a pore volume of about 0.64 cc./gram was calcined at 1000° F. for 16 hours. The alumina was then impregnated with sufficient aqueous solution of $(NH_4)_2MoO_4$ to give the desired amount of $MoO_3$, and after drying at 250° F., was calcined at 1000° F. for 16 hours. The catalyst support was then similarly impregnated with aqueous

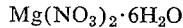
$Mg(NO_3)_2 \cdot 6H_2O$ dried at 250° F. and calcined at 850° F. for about 16 hours. Substitution of the resultant catalyst for the $MoO_3$—MgO reaction product per se in Example 2 gave the results of Table V:

Table V

| | |
|---|---|
| Temperature, °F. | 350 |
| Holding time, hrs. | 2 |
| Conversion of n-butyraldehyde, wt. percent | 75 |
| Selectivity, mol percent, of n-butyraldehyde to 2-ethyl-hexenal | 90 |

EXAMPLE 6

A catalyst consisting of the reaction product of $MoO_3$ and MgO, prepared as described in Example 1, was subjected to repeated use under the conditions of Example 2. Examination of the catalyst showed that the pill strength was not adversely affected by repeated use. Furthermore, only negligible attrition, if any, of the pills had occurred.

In contrast, pills of MgO alone, prepared under the same conditions, and pills consisting of a mere admixture of $MoO_3$ and MgO, disintegrated during a single experiment carried out as in Example 2. Furthermore, the metals content of products obtained in the presence of MgO per se was prohibitively high as shown by the data in Table VI:

Table VI

| Feed | P.p.m. Mg in Product | |
|---|---|---|
| | MgO Pills | MoO—MgO (reaction product) |
| n-Butyraldehyde | 7,500 | 9.5 |
| Acetone | 1,500 | |

These data further substantiate that the magnesium in the MoO—MgO catalysts of this invention are not present in the same form as in magnesia per se. The low metals content of the aldolization-dehydration product when the MoO$_3$—MgO catalyst is used also illustrates an important advantage of this catalyst. It is apparent that with catalysts containing MgO per se, as with other conventional catalysts such as the soluble metal soaps, a demetalling step is required to reduce the metals content of the products to acceptable leads. This is unnecessary with the MoO$_3$—MgO catalysts.

The alpha, beta-unsaturated aldehydes and ketones produced by the process of the present invention can be selectively hydrogenated catalytically with conventional catalysts and under conventional conditions, for example, with Raney nickel supported on kieselguhr at 200° to 250° F. and 200 p.s.i.g. hydrogen partial pressure, to produce the corresponding saturated aldehydes and ketones. Alternatively, the unsaturated reaction products may be completely hydrogenated under more severe conditions to the corresponding alcohols, for example, at 250° to 400° F. and 3000 p.s.i.g. hydrogen partial pressure.

What is claimed is:

1. A process for producing an alpha, beta-unsaturated carbonyl compound which comprises contacting a liquid feed comprising a C$_2$ to C$_{20}$ carbonyl compound having the formula:

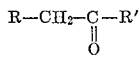

where R and R' are selected from the group consisting of hydrogen and alkyl, cycloalkyl, aryl and aralkyl radicals at a temperature between 50 and 600° F. with a catalyst consisting of molybdenum oxide and magnesium oxide in chemical combination, said catalyst having 0.5 to 15 weight parts of molybdenum oxide per part of magnesium oxide.

2. A process according to claim 1 wherein said catalyst comprises said reaction product in combination with a high surface area catalyst support.

3. A process according to claim 1 wherein said reaction product is obtained by calcining a mixture of said oxides at a temperature between about 300° to 1500° F.

4. A process according to claim 1 wherein at least one of said oxides is formed in situ.

5. A process for producing an alpha, beta-unsaturated carbonyl compound which comprises passing a liquid feed comprising a C$_2$ to C$_{20}$ carbonyl compound having the formula:

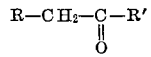

where R and R' are selected from the group consisting of hydrogen, and alkyl, cycloalkyl, aryl and aralkyl radicals into a reaction zone maintained at a temperature between 50° F. and 600° F., contacting said liquid feed in said zone with a solid, substantially insoluble catalyst consisting of equimolar proportions of molybdenum oxide and magnesium oxide in chemical combination, removing water of reaction from said zone, and recovering a liquid product comprising an alpha, beta-unsaturated carbonyl compound.

6. A process according to claim 5 wherein said water of reaction is distilled from said reaction zone.

7. A process according to claim 5 wherein the carbonyl compound in said liquid feed is a C$_2$ to C$_{10}$ aliphatic aldehyde having at least two alpha hydrogen atoms.

8. A process according to claim 5 wherein the carbonyl compound in said liquid feed is a C$_3$ to C$_{10}$ aliphatic ketone having at least two alpha hydrogen atoms.

9. A process for producing 2-ethylhexenal which comprises passing n-butyraldehyde into a reaction zone maintained at a temperature between 250° F. and 450° F., refluxing said n-butyraldehyde in contact with a catalyst consisting of equimolar proportions of molybdenum oxide and magnesium oxide in chemical combination, withdrawing water of reaction and n-butyraldehyde in azeotropic combination overhead from said zone, and recovering a liquid product comprising 2-ethylhexenal.

10. A process according to claim 9 wherein said water-n-butyraldehyde azeotrope is condensed, the condensate separated into a predominantly water phase and a predominantly n-butyraldehyde phase, and the latter phase is recycled to said reaction zone.

11. A process for producing mesityl oxide which comprises passing acetone into a reaction zone maintained at a temperature between 300° F. and 550° F., refluxing said acetone in said zone in contact with a catalyst comprising the reaction product of equimolar proportions of molybdenum oxide and magnesium oxide, withdrawing water of reaction and acetone in azeotropic combination overhead from said zone, and recovering a liquid product comprising mesityl oxide.

References Cited by the Examiner

UNITED STATES PATENTS 2,309,650   2/1943   McAllister et al. _____ 260—593

OTHER REFERENCES

Zettlemoyer: Abstract of application Serial No. 64,431, published Oct. 14, 1952.

LEON ZITVER, *Primary Examiner.*